_United States Patent_ [19]

Ulbing

[11] 4,223,554
[45] Sep. 23, 1980

[54] HOIST TEST STAND

[75] Inventor: Otmar M. Ulbing, Webster, N.Y.

[73] Assignee: Columbus McKinnon Corporation, Tonawanda, N.Y.

[21] Appl. No.: 46,472

[22] Filed: Jun. 7, 1979

[51] Int. Cl.³ .................... G01L 3/00; G01M 19/00
[52] U.S. Cl. ............................................. 73/133 R
[58] Field of Search .............. 73/1 B, 158, 141 R, 73/133 R

[56] References Cited
U.S. PATENT DOCUMENTS 3,722,267  3/1973  Gordon ........................... 73/133 R

FOREIGN PATENT DOCUMENTS 198742 of 1966 U.S.S.R. ............................. 73/133 R

Primary Examiner—S. Clement Swisher
Attorney, Agent, or Firm—Bean, Kauffman & Bean

[57] ABSTRACT

A self-contained portable test stand for testing hoists and the like both statically and dynamically. The test stand includes a cantilever beam adapted to support a hoist at one end and a hydraulic cylinder at the other. A variable mechanical advantage force transmitting means which may include a chain and chain block is provided to interconnect the hoist and the cylinder. The hydraulic loading of the cylinder is regulated both by a variable relief valve and a variable pressure and flow hydraulic pump which is controlled by a feedback line responsive to the pressure and flow in the system.

14 Claims, 1 Drawing Figure

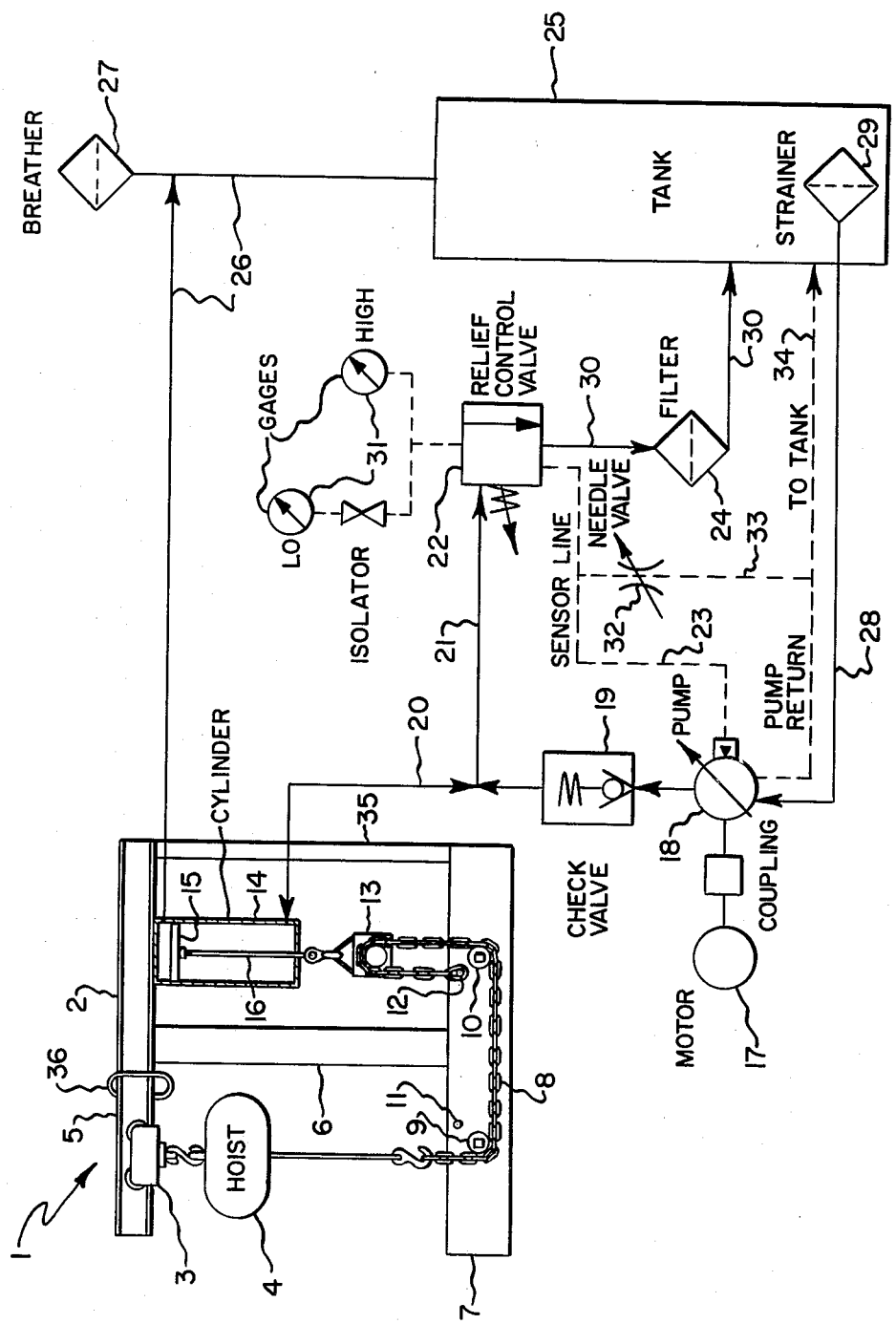

4,223,554

HOIST TEST STAND

TECHNICAL FIELD OF THE INVENTION

The present invention generally relates to a test apparatus for testing the rated load, the braking capacity, and the operation of an overload mechanism of a hoist. More specifically, the present invention deals with a hydraulically operated hoist test stand which is capable of testing a variety of hoists or hoist-like devices over a great range of loads.

BACKGROUND OF THE INVENTION

Hoists and tensioning devices in general such as pullers and load binders are conventionally tested at the manufacturer's plant prior to sale by the simple expedient of statically loading the hoist with a large number of weights and then operating the hoist as loaded. In the case of overhead hoists, this test is made at 125% of rated load. While this technique has been suitable for factory testing, it has proven to be quite unsatisfactory for field testing. A typical owner of a hoist does not normally have available a set of known weights suitable for hoist testing to its maximum rated load. Furthermore, the difficulty of transporting such large weights from place to place has discouraged hoist distributors, field servicemen and manufacturers from providing a field testing service. Accordingly, a hoist or similar tensioning device typically undergoes little or no tests with respect to maximum rated load, braking ability or the proper functioning of overload safety mechanisms once the hoist has left the manufacturer's plant. This is obviously not a desirable situation especially in the face of increased pressures from OSHA, theories of product liability, and industrial association established standards such as those set forth in the American National Standard for Cranes, Derricks, Hoists, Hooks, Jacks and Slings (ANSI B30.16—1973) published by the American Society of Mechanical Engineers.

SUMMARY OF THE INVENTION

It is quite evident therefore that a significant, long unsatisfied need has, up until now, existed for a portable self-contained hoist test stand or rig which may be moved about in the field from user to user. Such a portable test stand should be sufficiently versatile to be capable of testing a large variety of tensioning devices over a large range of test loads. Thus, the test rig should be equally suitable for testing a small hand operated hoist or tensioning device such as a load binder at a maximum rated load of approximately one eighth of a ton and a large industrial hoist at a maximum rated load of approximately ten tons.

The present invention satisfies the above described need in a simple, inexpensive and advantageous manner as will become apparent. The test stand of the invention, while being particularly well suited for testing hoists, is not limited thereto. However, for the purposes of facilitating the description of the invention, the below discussion will be made in terms of a hoist test stand.

The inventive hoist test stand generally consists of a portable self-contained frame mounted on a base and adapted to support both the hoist to be tested as well as a variable power load exerting means. The variable power load applying and/or load resisting means is capable of exerting a constant preselected load over a predetermined distance. A tension transmitting means of variable mechanical advantage is also provided to transmit the tension produced by the variable load exerting means to the hoist.

Proper selection of the mechanical advantage of the tension transmitting means as well as proper adjustment of the variable power load exerting means enables the test stand to test tension devices over the wide range of loads as previously indicated.

In the preferred embodiment, the frame of the test stand consists of a cantilever beam arrangement in which an I-beam is supported by a vertical column intermediate its two ends. One end of the I-beam is adapted to receive thereon and to support the hoist or tensioning device to be tested. The other end of the I-beam supports the active element of the variable power load exerting means, which comprises a hydraulic cylinder in the preferred embodiment. The tension transmitting means may include a length of chain or cable and an optional chain or cable block which may be alternatively connected to one or the other of the hoist or cylinder piston rod. The chain or cable is then connected at one end to the base of the test stand, threaded through the chain or cable block, over one or more redirecting sheaves and finally to the other of the hoist or piston rod of the hydraulic cylinder. In an additional arrangement, the chain or hook block may be omitted entirely so that the tension transmitting means is connected at its opposite ends to each of the hoist and the cylinder.

The hydraulic cylinder is powered by a hydraulic circuit which includes in its most simplified form a variable power pump and a variable orifice relief control valve. A feedback line from the hydraulic circuit controls the adjustment of the variable power pump so that the system maintains a constant pressure or load of a preselected magnitude regardless of whether the hoist is in its load lifting, load lowering or load holding mode.

BRIEF DESCRIPTION OF THE DRAWING

The present invention may be better understood and its numerous objects and advantages will become more apparent to those skilled in the art by reference to the accompanying drawing in which the test stand and one embodiment of a variable power loading means is illustrated.

DESCRIPTION OF THE PREFERRED EMBODIMENT

While the invention is susceptible of various modifications and alternative constructions, there is shown in the drawings and there will hereinafter be described, in detail, a description of the preferred or best known mode of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims to the full range of their equivalents.

Turning now to an examination of the figure, the self-contained, portable hoist test stand of the present invention will be described in detail. Generally, the hoist test stand 1 comprises a frame 2 consisting of a cantilever I-beam structural member 5, one end of which is adapted to receive thereon a trolley 3 of the hoist 4 to be tested and the other end of which is adapted to support a variable power means for exerting a preselected load throughout its entire active length, such as a hydraulic cylinder 14. I-beam 5 is supported intermediate its two ends by a central vertically disposed column member 6 which in turn is supported at its lower end by base 7. It also is rigidified by tension bar 35 to eliminate excessive strain and failure of the I-beam 5 and column 6 juncture. Base 7 includes a pair of rollers 9 and 10 and a pair of corresponding base anchor means 11 and 12.

In conjunction with the test stand 1 as above described, there is provided a load carrying means adapted to interconnect the hoist and the variable power means or hydraulic cylinder for transmitting a force therebetween. Such a force transmitting means may optionally include means for selectively changing its mechanical advantage. A length of chain 8, and a chain block or reeving device 13 depending from one end of piston rod 16 which is in turn connected to piston 15 within cylinder 14 may comprise the force transmitting means. As can be seen from the figure, chain 8 may be connected at one end to the hoist, run consecutively over rollers 9 and 10, reeved through chain block 13 and anchored to the test stand 1 by anchor means 12 at its end. Additional and alternative embodiments include; (1) an arrangement in which chain 8 is attached at one end to the hoist, passed consecutively over rollers 9 and 10 and attached at its other end to piston rod 16; and (2) an arrangement in which chain 8 is attached at one end to the end of piston rod 16, passed consecutively over rollers 10 and 9, reeved through chain block 13 attached to the hoist, and terminated by anchoring to the hoist test stand 1 by anchor means 11.

It will be recognized that these three alternative embodiments permit a considerable variation in the mechanical advantage provided by the force transmitting means. Such mechanical advantage variability is one of the features of the present invention which permits the test stand to test a variety of hoists over a wide range of loads.

Hydraulic cylinder 14 is illustrated as one example of a variable power means capable of exerting a preselected load throughout the entire length of a predetermined distance. The distance over which the hydraulic cylinder operates is preselected to be sufficient to permit a hoist to come up to fully loaded operating speed. Accordingly, hoists may be dynamically tested in both directions in their startup, shut down, and operating speed modes in addition to the usual static tests. In addition, it allows for operation of the hoist for at least one or more revolutions of its driving mechanism such as a pocket wheel or drum. As can be seen from the figure, one side of the piston 15 of hydraulic cylinder 14 is supplied with a source of pressurized hydraulic fluid by supply line 20 and motor 17/pump 18 combination. Pump 18 is protected against reverse flow by means of a conventional check valve 19. Pump 18 is of the variable output type so that the pressure and amount of hydraulic fluid available therefrom may be adjusted in accordance with the operation of the system.

Hydraulic line 21 is provided to fluidically connect hydraulic line 20 and an adjustable relief control valve 22. The discharge from relief control valve 22 is delivered by hydraulic line 30 and filter 24 to fluid storage tank 25 which may physically be located on the interior of column 6. Pump 18 draws its source of hydraulic fluid from tank 25 through strainer 29 and hydraulic line 28. Line 34 from pump 18 to tank 25 handles pump bypass drainage while the opposite side of piston 15 is vented by air line 26 and breather 27 as is the top of tank 25.

Variable output pump 18 and the pressure existing in lines 20, 21 as determined by relief control valve 22 are functionally interconnected by feedback hydraulic control line 23. Accordingly, the desired load placed on the hoist by cylinder 14 can be determined by the single adjustment of relief control valve 22 as determined by pressure gauges 31. Feedback control line 23 thus functions to maintain constant the selected hydraulic pressure by regulating the output of pump 18 in accordance with the pressure detected at relief control valve 22. Needle valve 32 and hydraulic line 33 are inserted between hydraulic lines 23 and 34 to enable further increase of the available load range of the test stand at its lower end. Thus, needle valve 32 may be adjustably opened when relief control valve 22 is in its full open position. By bleeding off some of the pressure in feedback control line 33 through needle valve 32 and line 33, the level of operation of pump 18 is reduced so as to enable the attainment of lower hydraulic pressure at cylinder 14.

The setup and operation of the above described hoist test stand 1 is as follows. First, a hoist 4 along with its hoist trolley 3 are rolled onto one end of I-beam 5 of frame 2. If the device to be tested lacks a trolley, a line 36 to which the device may be hooked is provided. Depending on the size and capacity of the hoist, the mechanical advantage of the tension transmitting chain system is selected by appropriately connecting chain block 13 either to cylinder 14 or to the load hook of hoist 4. Chain 8 is then appropriately connected: one possible connection arrangement being illustrated in the figure. Next, motor 17 is turned on to begin the pumping action of pump 18. The flow of hydraulic fluid opens check valve 19 to pressurize fluid conduits 20, 21 and one side of cylinder 14. Relief control valve 22 is then adjusted to select the desired hydraulic pressure or load as indicated on gauges 31. The pressure thus determined in line 21 by relief control valve 22 is detected by control feedback line 23 and regulates the pump in a manner which maintains the preselected load.

At this point, hoist 4 has been loaded by a load equal to the load indicated by gauges 31 multiplied by the mechanical advantage of chain 8 and chain block 13. In this way, the static load maintaining capacity of the hoist and the hoist brake unit are tested. Subsequently, hoist 4 is controlled to operate in its lifting mode. The hoist thus lifts against the load provided by cylinder 14. As the hoist lifts, piston 15 is pulled down by piston rod 16 and fluid is discharged through hydraulic line 20 to the relief control valve and subsequently to tank 25. As this occurs, the momentary increase in pressure in line 21 is fed back to pump 18 by control line 23 so that pump 18 is caused to reduce its output thereby maintaining the preselected load. The dynamic testing of the hoist is continued for the full desired range which may be equal to the range of the cylinder 14.

In order to test the down mode of the hoist, the down button is pressed which releases the hoist brake and hydraulic cylinder 14 pulls against hoist 4 with the predetermined load. When this occurs, hydraulic fluid returns to cylinder 14 from pump 18 which increases its pumping rate as a result of the feedback control action of hydraulic line 23.

What is claimed is:

1. A self-contained, portable test apparatus capable of dynamically and statically testing a tensioning, pulling or lifting device, such as a hoist, over a wide range of predetermined loads over a predetermined distance as to a variety of characteristics such as rated load, braking ability the functioning of overload safety mechanisms and generally every in service aspect of all of the operating and load bearing members of the device, said apparatus characterized by including:

(a) a portable support frame having a horizontally disposed structural beam member from which the device under test may be suspended, said beam member being supported by a vertically disposed column member which in turn is supported at its lower end by a base;

(b) a controllable variable power means suspended from said beam member for exerting a preselected load throughout the entire length of said predetermined distance; and (c) means of variable, selectable mechanical advantage adapted to interconnect the device under test and said variable power means for transmitting a tension force therebetween, said tension transmitting means including a tension element, guide means on said base for guiding said element and a reeving device.

2. The test apparatus as recited in claim 1 characterized in that said controllable variable power means includes a hydraulic cylinder driven by a variable output pump and both of which are hydraulically connected to a variable relief control valve, said variable output pump being operatively controlled and inversely responsive to the hydraulic pressure upstream of said variable relief control valve.

3. A test apparatus for testing a tensioning or lifting device, said apparatus characterized by including:

(a) a support frame having a structural member from which a tensioning or lifting device may be suspended;

(b) a controllable variable power means fixed to said frame for exerting a preselected load;

(c) means adapted to interconnect the suspended device and said variable power means for transmitting a force therebetween; and (d) said structural member being a horizontally disposed beam supported intermediate its two ends by a vertically disposed column member which is in turn supported at its lower end by a base, said variable power means being supported by said beam on one side of said vertically disposed member, the other end of said beam being adapted to support the tensioning or lifting device to be tested.

4. The test apparatus as recited in claim 3 characterized in that said force transmitting means includes means for selectively changing its mechanical advantage.

5. The test apparatus as recited in claim 4 characterized in that said force transmitting means includes a load carrying member trained around a reeving device.

6. The test apparatus as recited in claim 5 characterized in that said load carrying member and said reeving device are a chain and a chain block respectively.

7. The test apparatus as recited in claim 6 characterized in that said chain block is connected to one of the tensioning or lifting devices or said variable power means, and a first end of said chain is connected to the other of the tensioning or lifting device or said variable power means, while the second end of said chain is reeved through said chain block and attached to said frame.

8. The test apparatus as recited in claim 3 characterized in that said vertically disposed column member comprises a hollow tank for containing a fluid.

9. The test apparatus as recited in claim 3 characterized in that said base includes at least one sheave over which said force transmitting means is reeved.

10. The test apparatus as recited in claim 3 characterized in that said variable power means includes a hydraulic cylinder and a variable hydraulic fluid supply system.

11. The test apparatus as recited in claim 10 characterized in that said variable hydraulic fluid supply system includes a hydraulic pump whose output is fluidically connected to said cylinder and a variable relief control valve also fluidically connected to said cylinder whereby the pressure of the fluid exerted on said cylinder is a function of both the output of said pump and the adjustment of said variable relief control valve.

12. The test apparatus as recited in claim 11 characterized in that said hydraulic pump is a variable output pump whose output is controlled inversely proportional to the pressure existing upstream of said variable relief control valve.

13. The apparatus as recited in claim 12 characterized in that said force transmitting means includes a reeving device and a chain, and said structural member is a horizontally disposed beam supported intermediate its two ends by a vertically disposed column member of hollow construction suitable for storing fluid therein, said hollow column being supported at its lower end by said base, said hydraulic cylinder being connected to one end of said beam at one side of said hollow column, and said base including a pair of sheaves over both of which said chain is reeved.

14. The apparatus as recited in claim 3 characterized by including a hook receiving device supported by said beam to which the tensioning or lifting device may be attached.

* * * * *